(12) United States Patent
Kayhani et al.

(10) Patent No.: US 10,346,604 B2
(45) Date of Patent: Jul. 9, 2019

(54) LIGHT SEQUENCED CARD VALIDATION

(71) Applicant: Cubic Corporation, San Diego, CA (US)

(72) Inventors: Niosha Kayhani, Sutton (GB); Steffen Reymann, Guildford (GB)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 16/101,693

(22) Filed: Aug. 13, 2018

(65) Prior Publication Data

US 2019/0050552 A1 Feb. 14, 2019

Related U.S. Application Data

(60) Provisional application No. 62/544,489, filed on Aug. 11, 2017.

(51) Int. Cl.

| | |
|---|---|
| *H04L 9/00* | (2006.01) |
| *G06F 21/35* | (2013.01) |
| *G06F 3/01* | (2006.01) |
| *G06K 19/07* | (2006.01) |
| *H04B 7/04* | (2017.01) |
| *G07C 9/00* | (2006.01) |
| *G07C 9/02* | (2006.01) |

(52) U.S. Cl.
CPC ............... *G06F 21/35* (2013.01); *G06F 3/016* (2013.01); *G06K 19/0723* (2013.01); *G07C 9/00007* (2013.01); *G07C 9/02* (2013.01); *H04B 7/04* (2013.01)

(58) Field of Classification Search
CPC ............. H04M 1/0235; H04M 1/0237; H04M 2250/10; H04M 1/0233; G04F 10/06
See application file for complete search history.

(56) References Cited

FOREIGN PATENT DOCUMENTS

| | | |
|---|---|---|
| WO | 2005-015507 A1 | 2/2005 |
| WO | 2017-074045 A1 | 5/2017 |

OTHER PUBLICATIONS

International Search Report and Written Opinion dated Nov. 6, 2018 for International Patent Application No. PCT/US2018/046438 filed Aug. 13, 2018, all pages.

*Primary Examiner* — Ghazal B Shehni
(74) *Attorney, Agent, or Firm* — Kilpatrick Townsend & Stockton LLP (57) ABSTRACT

A multi-point validation device includes an elongate rail extending in a generally horizontal direction, a plurality of radio frequency antennas spaced apart along the length of the elongate rail, at least one reader module coupled with the plurality of radio frequency antennas, at least one visual indicator associated with each of the plurality of antennas and positioned proximate a corresponding one of the antennas, a processor, and a memory. The memory stores instructions that cause the processor to activate a single one of the radio frequency antennas, cause an indication that the single one of the radio frequency antennas is active to be produced by the at least one visual indicator associated with the single one of the radio frequency antennas, and receive data, at the at least one reader module, from at least one access media via the single one of the radio frequency antennas.

20 Claims, 4 Drawing Sheets

LIGHT SEQUENCED CARD VALIDATION

CROSS-REFERENCES TO RELATED APPLICATIONS

This application claims the benefit of U.S. Provisional Application No. 62/544,489, entitled "LIGHT SEQUENCED CARD VALIDATION", filed on Aug. 11, 2017, the entire contents of which are hereby incorporated by reference.

BACKGROUND OF THE INVENTION

Traditional radio frequency identification (RFID) readers provide a single small target antenna for card validation, usually similarly sized to the card and one reader powers one antenna. Such designs, while effective in small scale access control applications, generate problems when utilized in large scale applications, such as transit systems, sporting events, and the like. For example, the single validation point necessitates that a large number of validation devices be provided to accommodate large crowd sizes. Such applications require that a significant amount of land/property be allocated to the validation devices. Moreover, the use of large numbers of validation devices has high costs associated with the purchase, maintenance, and operation of the validation devices. Even with large numbers of validation devices, queue times may be excessive as the users must all queue up to try to validate access media at the single validation target.

BRIEF SUMMARY OF THE INVENTION

Embodiments of the present invention are directed to multi-point validation devices that move an active validation target along a length of a elongate rail or other validation surface. By moving the validation target, a user may validate his access credential at any number of discrete validation points of a single validation device, which may reduce or eliminate queueing that occurs as a result of users lining up to validate an access credential at a single point of the device. For example, several users may be alongside the rail and may each be validated in turn at their current positions prior to advancing to a common point where a single validation target would be. In some embodiments, the multi-point validation device may cycle through the various validation targets in a sequential order. In other embodiments the multi-point validation device may choose a particular validation target based on detecting the presence of an access credential within a signal range of the particular validation target.

In one embodiment, a multi-point validation device is provided. The device may include an elongate rail extending in a generally horizontal direction and a plurality of radio frequency antennas spaced apart along the length of the elongate rail. The device may also include at least one reader module coupled with the plurality of radio frequency antennas and at least one visual indicator associated with each of the plurality of radio frequency antennas and positioned proximate a corresponding one of the plurality of antennas. The device may further include at least one processor and a memory. The memory may be configured to store instructions that, when executed cause the at least one processor to activate a single one of the plurality of radio frequency antennas, cause an indication that the single one of the plurality of radio frequency antennas is active to be produced by the at least one visual indicator associated with the single one of the plurality of radio frequency antennas, and receive data, at the at least one reader module, from at least one access media via the single one of the plurality of radio frequency antennas.

In another embodiment, a method of operating a multi-point validation device is provided. The method may include activating a single one of a plurality of radio frequency antennas, wherein the plurality of radio frequency antennas are positioned along a length of a generally horizontal elongate rail. The method may also include causing an indication that the single one of the plurality of radio frequency antennas is active to be produced by at least one visual indicator associated with the single one of the plurality of radio frequency antennas, the at least one visual indicator being positioned proximate the single one of the plurality of radio frequency antennas. The method may further include receiving data by at least one reader module from at least one access media via the single one of the plurality of radio frequency antennas.

In another embodiment, a method of operating a multi-point validation device includes activating each of a plurality of radio frequency antennas positioned on an elongate rail in a sequence such that only a single one of the plurality of radio frequency antennas is active at a single time. The method may also include providing a visual indication that the single one of the plurality of radio frequency antennas is in an active state. The method may further include receiving data by at least one reader module from at least one access media via the single one of the plurality of radio frequency antenna.

BRIEF DESCRIPTION OF THE DRAWINGS

A further understanding of the nature and advantages of various embodiments may be realized by reference to the following figures.

DETAILED DESCRIPTION OF THE INVENTION

The ensuing description provides embodiment(s) only, and is not intended to limit the scope, applicability or configuration of the disclosure. Rather, the ensuing description of the embodiment(s) will provide those skilled in the art with an enabling description for implementing an embodiment. It is understood that various changes may be made in the function and arrangement of elements without departing from the spirit and scope of this disclosure.

Embodiments of the invention(s) described herein are generally related to reading contactless cards as fare media in transit systems. That said, a person of ordinary skill in the art will understand that alternative embodiments may vary from the embodiments discussed herein, and alternative applications (e.g., other than transit systems) may exist. Indeed, alternative embodiments may be employed virtually anywhere contactless cards are read. In some embodiments, this could be rolled out to various contactless terminals that currently operate with a single reader per device.

The ensuing description provides embodiment(s) only, and is not intended to limit the scope, applicability or configuration of the disclosure. Rather, the ensuing description of the embodiment(s) will provide those skilled in the art with an enabling description for implementing an embodiment. It is understood that various changes may be made in the function and arrangement of elements without departing from the spirit and scope of this disclosure.

Embodiments of the invention(s) herein enable RFID-based contactless cards to be read and validated at any active point along an elongated reader instead of only on a single target. This increases usability of readers significantly, as for instance in a transport environment, passengers no longer have to queue up on a single reader device but can walk along a railing that allows validation at any point along it that is active. According to embodiments, a system can electronically move the "active" validation area along the railing whilst clearly indicating to the passenger where the active area currently is.

The invention(s) described herein may provide several concepts. For example, embodiments may provide an elongated RFID reader antenna configuration along a railing (or similar validation surface). Embodiments may automatically move an "active" reading area along the railing. The active reading area may be actively electronically steered and connected to single reader module such that one of any number of points along a rail of the validation device may be activated. Embodiments of the invention may also use a light (e.g., yellow/red/green) and/or other visual indicator moving along the rail in conjunction to inform users of the location of the active reading area. Embodiments may also provide validation feedback to passenger at their point of tap, such as using lights and/or other visual interface. In some embodiments, the active area is lit (and activated) in a regular sequence that makes it easy for users to understand and predict within seconds. In some embodiments, along with (or instead of) visual feedback, sound and/or tactile feedback may be produced along the rail to indicate the current active area. In some embodiments, the active area may be non-sequential and may instead be driven based on a location of a user in relation to the rail. For example, the validation device may detect a position of the user, the user's hand, and/or the user's access credential and may activate a reading area proximate to the detected feature(s).

Embodiments of the invention utilize an electronic switching module to turn individual antennas on/off in sequence (which may be based on detection of users) and triggers a micro-controller to output the lights in accordance to which antenna is currently active. As such, embodiments may provide one or more advantages over traditional validation devices. For example, embodiments of the invention may spread out a validation area along a railing or similarly elongated geometry and removing need to queue up for card validation on a single target. A long reader antenna (which may include a series of antennas) may be connected to single reader module such that no hardware changes required on the module. In other words, a single reader module (which is typically the most expensive component of a validation device) may be utilized with an elongate antenna assembly that has a number of reading areas. Embodiments of the invention may provide a light indicator at an active position of the reader antenna(s) that can provide feedback to user. Multi-point validation devices according to embodiments of the invention may operate using electronic and/or mechanical switches to cycle the active antenna positioning.

Figure 1:
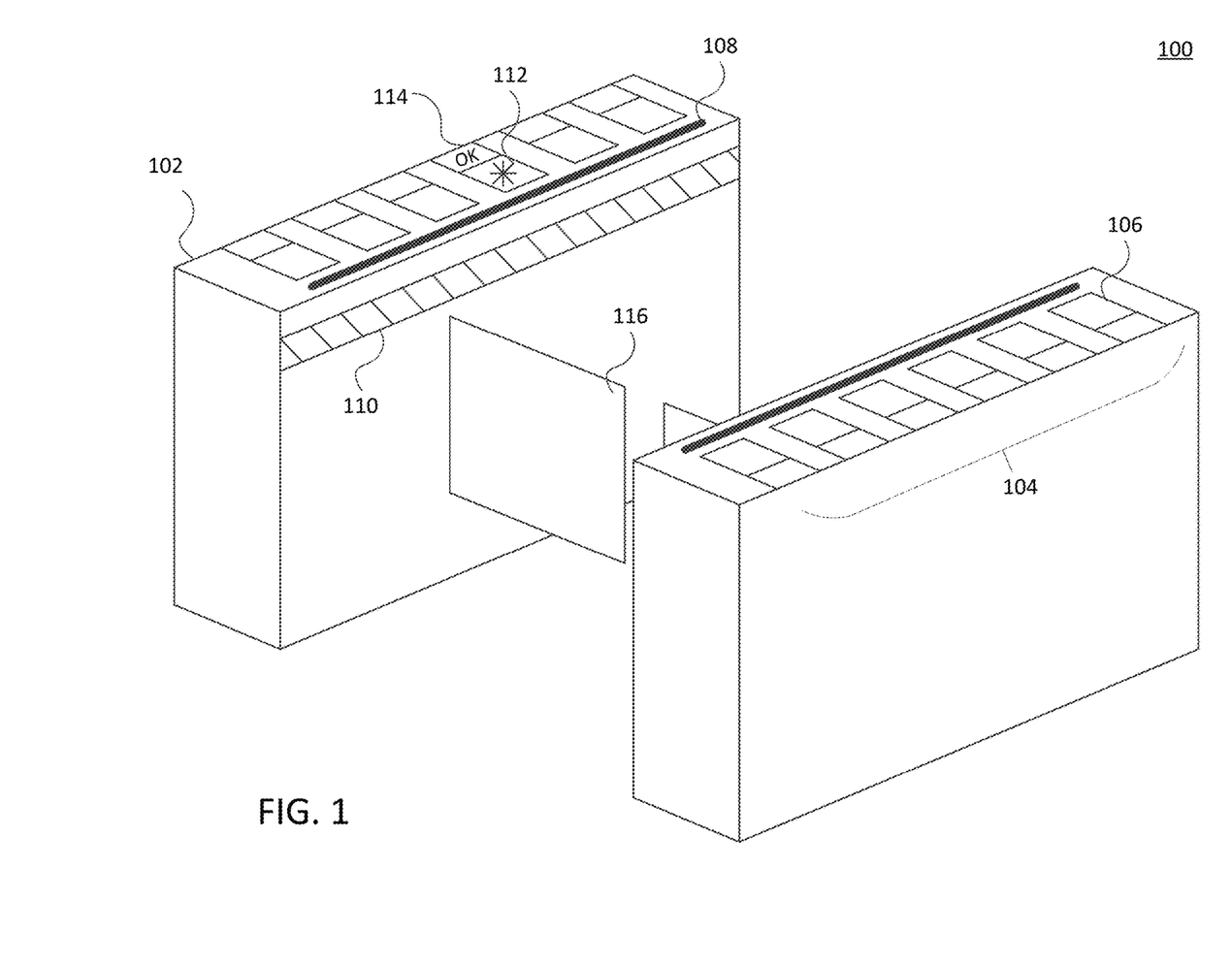
FIG. 1 depicts a multi-point validation device according to embodiments.

Turning now to FIG. 1, one embodiment of a multi-point validation device 100 is shown. Validation device 100 may include one or more rails 102 and/or other elongate validation surfaces that are positioned in a generally horizontal orientation. In some embodiments, a single rail 102 may be positioned at an entrance and/or an exit to an access controlled area. In other embodiments, a pair of rails 102 may be spaced apart to define an entry/exit path between the two rails 102. In some embodiments, the validation device 100 may be used as only an entry validation device, only an exit validation device, or may be bi-directional such that the validation device 100 may be switched between an entrance validation device and an exit validation device based on crowd flows.

An antenna assembly 104 is provided on at least one of the rails 102. As shown here, both rails 102 include an antenna assembly 104. Each antenna assembly 104 includes a number of discrete validation points 106, which may be in the form of separate antennas that are spaced along at least a portion of the length of the rail 102. While shown here with six antennas spaced along the length of each rail 102, it will be appreciated that any number of antennas may be provided on a single rail 102. The antennas 106 may be radio frequency (RF) antennas, such as near field communication (NFC) and/or other short range radio antennas. The location of each antenna 106 may be designated by a reader target on the rail 102, which may be a symbol, color, signage, and/or other identifier of a particular antenna location. In some embodiments, a different material may be provided over each antenna 106 than is provided on a remainder of the validation surface of the validation device 100 such that the location of each antenna 106 is readily apparent.

Figure 2:
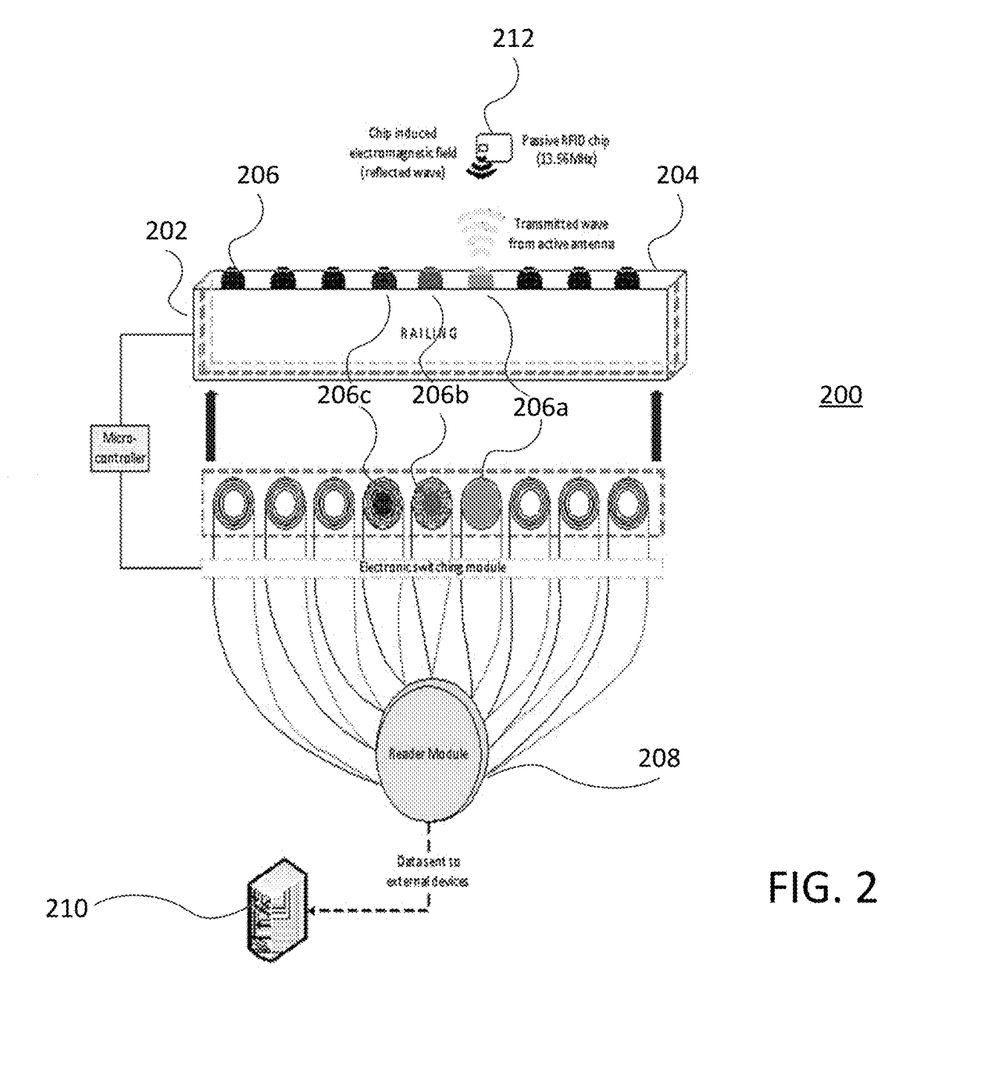
FIG. 2 depicts a validation system according to embodiments.

Oftentimes, each antenna assembly 104 may be hooked up to a single reader module 208 (shown in FIG. 2). In such embodiments, only a single antenna 106 of a particular antenna assembly 104 may be activated at a single time. This allows the reader module to receive data from a single access credential (such as a smartcard, mobile phone, tablet computer, and/or other RF-enabled access media device) and validate the access credential without a significant risk of signal interference/collision or mixing up data from multiple devices. Thus, power and/or control of each antenna 106 may be cycled on and off in some sequence that allows only a single one of the antennas 106 to be active at any given time. Each antenna 106 may be activated for a short, predetermined period, such as 1 second, 3 seconds, 5 seconds, 10 seconds, etc. The predetermined period may be based on an average time it takes a reader module to read data (and possibly write data in embodiments where stored value credentials are used) from an access credential using one of the antennas 106. The predetermined period may provide sufficient time for a read and/or write procedure as well as a buffer period that allows for time for users to position their access credentials within a signal range of the antenna 106. In some embodiments, if the validation device 100 detects that a read and/or write process is occurring, the predetermined period may be extended to allow for the completion of the current read and/or write process. Such features may help reduce the likelihood of RF tear that may occur if a read and/or write process is terminated prior to the completion of the procedure.

The sequencing of antenna activation may be done in a number of ways. For example, sequences that repeat in a predictable manner may utilized. For example, one of the antennas 106 on a far end of the antenna assembly 104 may be activated first, followed by the second antenna 106 (with the first antenna 106 being deactivated), third antenna 106 (with the second antenna 106 being deactivated), and down the line with a single antenna 106 being in an active state at any given point in time. Upon reaching a last antenna 106, the pattern may repeat. Other repeated patterns, such as skipping one antenna 106 between each activation (every other antenna 106), incrementing one antenna 106 from each end of the antenna assembly 104 in an alternating manner, and/or any other easily detected/predictable pattern of activation may be used. The use of such predictable, repeating patterns enable users to quickly figure the pattern out so that they may easily position their access credential over a validation target while the target is activated.

In some embodiments, the sequence of antenna activation may be based on detecting the presence of a user and/or an access credential of the user within a proximity of a particular one of the antennas 106. Detecting the presence of the user and/or credential may be done in several ways. For example, in some embodiments, the read/write functionality of the antennas 106 may be disabled with the antennas are in an inactive state, but the antennas 106 may still emit a detection signal that may be modulated by the presence of an RF signal from the credential within the signal range of the antenna 106. Upon detecting this modulation at a particular one of the antennas 106, the validation device 106 may determine that an access credential is within range of the particular antenna 106 and may activate the antenna in response. In some embodiments, rather than having the antennas 106 emit the detection signal when inactive, an additional antenna assembly (not shown) may be included that is configured solely to be used to detect modulation that is indicative of the presence of an access credential. The additional antenna assembly may include a same number and/or arrangement of antennas as the antenna assembly 104, with each of the antennas of the additional antenna assembly being positioned near a corresponding one of the antennas 106 of the antenna assembly 104 such that both antenna assemblies have approximately identical signal ranges.

In other embodiments, the detection of a user and/or credential may be done using one or more proximity sensors. For example, in some embodiments, one or more credential proximity sensors 108 may be position on or near a top/validation surface of the rail 102. As shown here, credential proximity sensors 108 are positioned on a top of the validation surface and extend oolong a same or similar length as the antenna assembly 104. The credential proximity sensors 108 may be configured to detect when the user's hand and/or credential are positioned within a signal range of one of the antennas 106. For example, proximity sensors 108 may include one or more cameras, radar sensors, LIDAR sensors, ultrasound sensors, infrared (IR) sensors, and/or other position sensors. The credential proximity sensors 108 may be calibrated such that when a user's hand and/or credential is detected, a nearest antenna 106 to the detected hand and/or credential may be identified. For example, when implemented as shown in FIG. 1, credential proximity sensors 108 may be positioned on an interior side of the rail 102 such that the credential proximity sensors may detect when an object (such as a hand and/or credential) is above the sensor array and/or over a particular one of the antennas 106. As just one example, the credential proximity sensors 108 may include IR sensors. If the IR sensors detect a break in an emitted IR beam, the credential proximity sensors 108 may determine that a user's hand and/or credential is positioned proximate one of the antennas 106. Based on the position of the beam break, it may be determined which of the antennas 106 should be activated.

In other embodiments, the credential proximity sensors 108 may be able to detect objects within a 3-dimensional space that covers some or all of the signal range of the antenna assembly 104. In such embodiments, the credential proximity sensors 108 may be positioned on either side of the antenna assembly 106 and/or in between the individual antennas 106. The 3-dimensional space may be monitored and when an object is detected a position of the object may be determined. A nearest one of the antennas 106 may be identified based on this position.

In other embodiments, one or more user proximity sensors 110 may be provided on validation device 100. user proximity sensors 110 may be configured to detect the presence and location of a user relative to the validation device 100. For example, the user proximity sensors 110 may be positioned on a side of rail 102 and be configured to detect when a user is positioned alongside the validation device 100 and one or more of the antennas 106. Similar to the credential proximity sensors 108, the user proximity sensors 110 may include one or more cameras, radar sensors, LIDAR sensors, ultrasound sensors, infrared (IR) sensors, and/or other position sensors. As just one example, the user proximity sensors 110 may include IR sensors. If the IR sensors detect a break in an emitted IR beam, the user proximity sensors 110 may determine that a user is positioned alongside the validation device 100 and/or one or more of the antennas 106. Based on the position of the beam break, it may be determined which of the antennas 106 should be activated. In other embodiments, the user proximity sensors 110 may be able to detect objects within a 3-dimensional space alongside the validation device 100 and/or antenna assembly 104. The 3-dimensional space may be monitored and when an object is detected a position of the object may be determined. Based on this position a nearest antenna 106 may be identified.

Upon detection of a user and/or credential and upon identification of a nearest antenna 106 to the detected user and/or credential, the validation device 100 may activate the identified antenna 106. The identified antenna 106 may be activated for a predetermined time period, such as 1 second, 3 seconds, 5, second, 10 seconds, etc. to perform any necessary read and/or write procedures. In some embodiments, if a read and/or write procedure is still in progress when the predetermined time period has elapsed, the validation device may extend the period to allow the procedure to finish to minimize the risk of RF tearing.

The validation device 100 may include one or more visual indicators that can alert users as to which antenna 106 is currently active and/or a result of a validation of the user's access credential. For example, validation device 100 may include one or more lights 112, such as a light emitting diode (LED) that may be position above and/or near each antenna 106. The light 112 may be illuminated when the associated antenna 106 is activated. In other embodiments, all of the lights 112 may be illuminated at all times, with different colors representing different antenna statuses. For example, the light 112 for the active antenna 106 may be illuminated green, which other (inactive) antennas 106 may be illuminated red. In some embodiments, a different color may be used to identify a next one or two antennas 106. For example, the next inactive antenna 106 to be activated in the sequence may be illuminated yellow to alert users that the antenna 106 will activated next. It will be appreciated that the above color/light schemes are merely one example, and that many other combinations of colors, lights schemes, and/or other visual indications may be used in accordance with the present invention.

In some embodiments, the lights 112 may also be configured to provide feedback related to a result of a validation.

For example, as a user places his access credential within the signal range of an active antenna 106, a reader module of the validation device 100 may read data from the access credential that is detected by the active antenna 106. The validation device 100 may validate the access credential based on this data (either locally or by communicating with a validation back office (not shown). Once a validation result is determined (user is authorized to enter the access controlled area or not), the lights 112 may provide an indication of the result. For example, a particular light associated with the active antenna 106 may change to a different color and/or may flash or otherwise illuminate in a particular pattern. For example, a successful validation may result in the light 112 flashing quickly with green illumination while an unsuccessful validation may result in the light 112 flashing slowly with red illumination, although other colors, patterns, and/or other signaling mechanisms are possible.

In some embodiments, a graphical interface 114 may be included along at least a portion of the antenna assembly 104. As shown here, a graphical interface 114 is positioned alongside each of the antennas 106 of the antenna assembly 104. The graphical interfaces 114 may be configured to alert users as to which of the antennas 106 is active, such as by displaying a color, shape, symbol, and/or text-based message. For example, the graphical interface 114 may display the word "ACTIVE" in large letters and/or in a high contrast color to alert users that an associated one of the antennas 106 is currently active. The next antenna 106 to be activated may be shown as "NEXT", and other inactive antennas 106 may be labeled as "INACTIVE", "OFF", or "PLEASE WAIT". It will be appreciated that other labels may be used. In some embodiments, any text may be color coded. For example, a label for an active antenna 106 may be in green, a next antenna 106 may be labeled in yellow, and other inactive antennas 106 may be labeled in red.

The graphical interface 114 may also be configured to provide indications of validation results. For example, a successful validation may be indicated by a green "OK" and/or other message displayed on a graphical interface 114 associated with a particular antenna 106. An unsuccessful validation may be indicated by a red "ERROR", "STOP", "PLEASE TRY AGAIN", and/or other message displayed on the graphical interface 114 associated with the relevant antenna 106. It will be appreciated that other text-based messages, shapes, symbols, colors, and the like may be displayed to indicate validation results.

As the graphical interfaces 114 often provide text-based and/or symbolized messages that a user may have to read or otherwise interpret, the graphical interfaces 114 may be positioned on an outer portion of the rail 102 such that the users may still view and/or read the corresponding one of the graphical interfaces 114 while their hand and/or access credential are positioned over a corresponding antenna 106. However, other positions may be contemplated. For example, in some embodiments, a single display screen/graphical interface 114 may be provided at a far end of the validation device 100. A validation message may be provided on the single display screen that may also include an identifier of the validated user along with an indication of the result of the validation. For example, the identifier could be the user's name and/or other identifier that is known to the user. For example, each user may select a numerical identifier or nickname that is used for communicating the validation results such that the user's actual name is not displayed to other patrons.

In some embodiments, only one of the lights 112 or the graphical interfaces 114 may be used, while in other embodiments both may be used in a single validation device 100. In some embodiments where both are used, both types of indicators may be used for both active antenna identification and validation results. In other embodiments having both lights 112 and the graphical interfaces 114, the validation device 100 may use one of the indication systems for the active antenna identification and the other for validation results. As just one example, the lights 112 may be used for active antenna identification while the graphical interfaces 114 may be used for the validation results. While these may be switched in some embodiments, the use of lights 112 for active antenna identification may provide indications that are more easily seen and identified, especially at a distance as no reading is necessary. Similarly, given the possible need for more complex information to be provided for validation results, graphical interfaces 114 may provide a more advantageous medium for providing such information.

In some embodiments, along with, or in place of, visual indications, the validation device 100 may provide an audible and/or haptic/tactile feedback indication of an active antenna identification and/or validation results. For example, one or more speakers (not shown) may be positioned on the validation device 100 (such as at locations near the individual antennas 106 of the antenna assembly 104). These speakers may be configured to emit a sound to alert users that a particular antenna 106 is active. For example, a speaker may emit a voice recording or other speech pattern that alerts users that "antenna A" or "antenna 1" (or other antenna identifier) is currently active. In other embodiments, the speaker may emit a series of beeps, a single long beep, and/or other sound/pattern at a location near an active antenna 106 to indicate that the antenna 106 is active. The speakers may also (or alternatively) be configured to indicate a validation result. For example, after data has been read and validated, the speaker may produce one or more chimes and/or other sounds that are selected to represent a positive indication, while one or more buzzers and/or other sounds that are selected to represent a negative validation result may be produced. In some embodiments, a worded message may be emitted from the speaker. For example, the speaker may emit a message saying "OK", "VALIDATION SUCCESSFUL", and/or other positive message to indicate a successful validation, while emitting a worded message saying "VALIDATION ERROR", "PLEASE TRY AGAIN", and/or other negative message indicating an unsuccessful validation result may be provided. It will be appreciated that such messages and sounds are merely examples and other messages and/or sounds (or combinations thereof) may be emitted in accordance with the present invention.

Haptic and/or tactile feedback may also be provided. For example, a portion of the validation device 100 near each of the antennas 106 may include a device that may vibrate and/or otherwise produce a movement that may be detected by feel and/or visually by a user. Vibrations and/or other movements may be done to indicate an active antenna 106 and/or a particular validation result, with different vibration/movement patterns/intensities being used to indicate different messages/results.

In some embodiments, the validation device 100 may be configured to provide validation result feedback to the user's access credential. For example, for access credentials that are mobile phones (or other devices with lights, screens, speakers, and/or vibration mechanisms), the validation device 100 may send a command that causes 1) a light to illuminate with a particular color and/or pattern to indicate a particular validation result, 2) a message to be displayed on a display screen of the access credential indicating a result of the validation, 3) a sound (such as beeps, chimes, buzzers, voice messages, etc.) to be emitted from a speaker of the access credential indicating a result of the validation, and/or 4) haptic feedback (such as a particular vibration pattern/intensity) to be provided via a vibration mechanism of the access credential. In some embodiments, the command may be sent via the antenna 106 that received the credential data from the access credential. For example, while the access credential is still within the signal range of the antenna 106, the antenna 106 may emit an RF signal that causes the access credential to perform a specific function(s) based on the validation result. In other embodiments, a longer range connection may be used to provide the signal to the access credential. For example, a Bluetooth™ LTE, WI-FI, and/or other wireless connection may be used to send the feedback command to the access credential. This signal may be sent while the access credential is still within the signal range of the antenna 106 and/or after the access credential is moved outside of the signal range. In some embodiments, the longer range connection may be established between the validation device 100 and the access credential, while in other embodiments another device (such as a beacon and/or a central validation system) of the entity operating the validation device 100 may send the feedback command to the access credential.

In some embodiments where the sequence of the antenna activation is based on detecting users and/or their access credentials, it may be possible to detect multiple users and/or credentials simultaneously. The validation device 100 may have different rules in place that control what it does in such instances. For example, if multiple users/credentials are detected simultaneously, the validation device 100 may activate the antenna 106 that is closest to the first user/credential detected. In other embodiments, a an antenna 106 closest to the user/device furthest along the rail 102 may be activated first. In other embodiments, a prioritization order may be established for each antenna 106 within the antenna assembly 104. When multiple users/credentials are simultaneously detected, the prioritization order may determine which antenna 106 proximate one of the users/credentials is activated first. It will be appreciated that these are merely examples and that other rules may be used to control the order of activation of antennas 106 when multiple users/credentials are detected. Users whose closest antennas 106 are not activated first may receive an indication (such as via lights 112 and/or graphical interface 114) that indicate that the closest antenna 106 is queued up and will be activated shortly. This helps the user understand that they are not currently being validated, but have been detected and will be validated shortly (in a manner of seconds). For example, lights 112 near the closets antenna 106 may be illuminated yellow and/or a closest graphical interface 114 may display a message instructing the user of their queue status, such as "PLEASE WAIT" (or other message). It will be appreciated that other indications of waiting are possible in accordance with the present invention.

Oftentimes in embodiments where a sequence of the antenna activation is based on detecting users and/or their access credentials, the users may continue moving along the rail 102 (which may have a length ranging from 1 foot to any number of feet long) as they wait. This movement may speed up the queueing process and increase throughput through the validation device 100. The credential proximity sensors 108 and/or user proximity sensors 110 may be configured to continuously track a position of each detected user passing through and/or alongside the validation device 100 and/or antenna assembly 104. For example, in IR systems, the validation device 100 may track continuous breaks in emitted IR beams and/or otherwise be configured to correlate multiple breaks with a single user based on the validation/read/write history, the number of IR beam breaks, the position of each of the IR beam breaks, and/or the timing of each of the IR beam breaks. In three dimensional proximity systems, the sensor arrays may track the position of each user/credential over time. Based on the tracking by the validation device 100, a correct, most efficient antenna activation order may be determined and utilized, and the next antenna 106 in the queue for activation may move along with the respective next user. Such movement and tracking may be done for all detected users.

In some embodiments, the validation device 100 may include one or more barriers 116, such as gates, turnstiles, paddles, and/or other physical barrier mechanisms. These barriers 116 may have a default state, such as unlocked/locked and/or unobstructing/obstructing. If the user closest to the barrier 116 has been successfully validated, the barrier 116 may be in an unlocked and/or obstructing state. In embodiments where such a state is not the default state, the validation device 100 may send a signal to the barrier 116 to switch the barrier 116 to the unlocked (in which a mechanical and/or electrical locking mechanism is disengaged such that the barrier 116 may be opened) and/or unobstructing state (with physical barrier mechanisms moved out of the path of the user) such that the user may pass and enter the access controlled area. If the user closest to the barrier 116 has not been successfully validated, the barrier 116 may be in a locked (in which a mechanical and/or electrical locking mechanism prevents the barrier 116 from being opened) and/or obstructing state (with physical barrier mechanisms moved into of the path of the user). In embodiments where such a state is not the default state, the validation device 100 may send a signal to the barrier 116 to switch the barrier 116 to the locked and/or obstructing state such that the user may not enter the access controlled area.

Each validation device 100 may include a processing unit (not shown), which may include one or more processors that control the operation of the validation device 100. For example, the processor may control which antenna 106 is currently in the activated state and may control the switching on and off of each of the antennas 106 according to the sequence rules (timing/repeating sequence vs. detection of users/credentials). The processor may implement any prioritization rules and may control whether a predetermined activation time has elapsed and/or needs to be extended. The processor may instructed the visual, audio, and/or haptic feedback mechanisms to provide the necessary antenna activation identification feedback and/or validation feedback. The processor may also control the reception and validation of data (either locally or through a central validation office/system). The processor may also control the actuation of any barriers 116 of the validation In some embodiments, a validation device 100 may be considered to include the entire set of equipment shown in FIG. 1 (specifically both rails 102), while in other embodiments, the validation device 100 may just include a single rail 102/antenna assembly 104. In such embodiments, multiple validation devices 100 may share a gate 116 and/or other physical barrier. In some embodiments, a number of validation devices 100 may be positioned side by side to form an entry and/or exit validation corridor. In some embodiments, each of the validation devices 100 may be oriented in the same direction (permit entry validation or exit validation) and/or some of the validation devices 100 may be set up for entry validation while others in the group may be set up for exit validation. It will be appreciated that the arrangement of entry/exit validation devices 100 may include any number and/or pattern of entry and/or exit validation devices. Moreover, in some embodiments the orientation of each of the validation devices 100 may be switched to accommodate larger entry/exit crowds.

Turning now to FIG. 2, a validation system 200 is shown according to embodiments of the invention. System 200 includes a validation device 202, which may be the same or similar to the validation device 100 described above and may include some or all of the features described in accordance with validation device 100. As shown, validation device 202 includes an elongate rail 204, which includes a number of antennas 206 spaced apart along a length of the rail 204. Each antenna 206 includes one or more visual indicator devices (such as lights 112 or graphical interfaces 114) and may include one or more proximity sensor systems (such as credential proximity sensors 108 and/or user proximity sensors 110), barriers, and/or other indication systems. Here, a single reader module 208 is coupled with each of the antennas 206. The validation device 200 may activate a single one of the antennas 106 at a time, which that the reader module 208 only receives data from (and/or writes using) a single antenna 206 at any given time.

The reader module 208 may be coupled with a local database (not shown) and/or an external validation system 210. As data is received via an active antenna 206, the data may be validated by the validation device 202. This may be done by the validation device 202 determining that the data from an access credential 212 (which may be received as a reflected wave from a chip-induced magnetic field, NFC, and/or other passive and/or active RF modulation) indicated that the access credential 212 has a sufficient stored value to enter (or exit) an access controlled area. In other embodiments, the data may indicate that the user is otherwise authorized to enter (or exit) the access controlled area, such as by comparing the data to one or more positive and/or negative lists. These lists may be stored locally on the validation device 202 for quicker determinations (and may be updated periodically) and/or may be stored on the external validation system 210. In such cases, the validation device 202 may communicate the received data to the external validation system 210, which may make the validation determination and return a validation result to the validation device 202. The validation result may be indicated to the user via the visual indication devices and/or via the access credential 212. For example, the access credential may be commanded by the validation device 202 and/or external validation system 210 to provide audio, visual, and/or haptic feedback that indicates the result of the validation. While not shown, validation device 202 may include one or more barriers that may be unlocked/locked and/or put into an unobstructing/obstructing state based on the result of the validation.

The validation device 202 may provide an indication (such as using one or more of the visual indication devices) of which antennas 206 is currently active, as well as an indication of which of the antennas 206 is going to be activated next. In some embodiments, the validation system 202 may also indicate which of the antennas 206 has most recently been deactivated. By providing such indications, it makes it easier for users to identify an appropriate antenna 206 to use to validate their access credential 212. For example, as shown here, antenna 206*a* is illuminated in a first manner (such as in green) to indicate that it is currently active, while antenna 206*b* is illuminated in a second manner (such as in yellow) to indicate that it is about to be activated and antenna 206*c* is illuminated in a third manner (such as in orange) to indicate that it was recently active but was just deactivated as antenna 106*a* was activated. The remaining antennas 206 may be illuminated in a fourth manner (such as in red) to indicate that they are inactive and not about to be activated. It will be appreciated that other indication means (including the use of graphical interfaces, such as graphical interfaces 114), colors, patterns, shapes, messages, and/or other visual indications (and/or audio/haptic) may be used to further indicate the status of all or a subset of the antennas 206.

The sequence of the activation of the antennas 206 may be controlled based on a predetermined, predictable repeating pattern and/or may be based on the detection of users and/or credentials near a particular antenna 206 as described in relation to FIG. 1. The switching of the antennas 206 between the on/off states may be done by an electronic switching module that is controlled by a processing unit of the validation device 202.

In some embodiments, the antennas 206 operate by emitting an active RF electromagnetic field that is controlled by the reader module 208. This field may be range limited, such as by using NFC protocols. The electromagnetic field may be modulated by a passive RFID chip or antenna in the access credential 212. For example, for NFC-enabled access credentials, a 13.56 MHz signal may be produced as the passive chip/antennas of the access credential 212 is brought into the electromagnetic field produced by an active antenna. Data may be communicated to the reader module 208 via the active antenna 206 based on this interaction. In some embodiments, the reader module 208 may also write to the access credential 212 (such as in stored value applications) and/or may send feedback commands to the access credential 212 through the electromagnetic field. Any reading/writing between the reader module 208 and the access credential 212 may be encrypted to protect any sensitive data such as rider identification information and/or payment account information. While discussed primarily in relation to passive RF access credentials 212, it will be appreciated that active RF access credentials 212 may be utilized in accordance with embodiments of the invention.

While shown here with a single reader module 208, it will be appreciated that embodiments may include multiple reader modules 208 in a single validation device 202. By including additional reader modules 208, a validation device 202 may activate more antennas 206 simultaneously, as each reader module 208 can handle its own validation determination. While expensive, such solutions may be utilized in applications with extreme crowd sizes and/or applications where space does not permit a sufficient number of validation devices 202 to be utilized.

Figure 3:
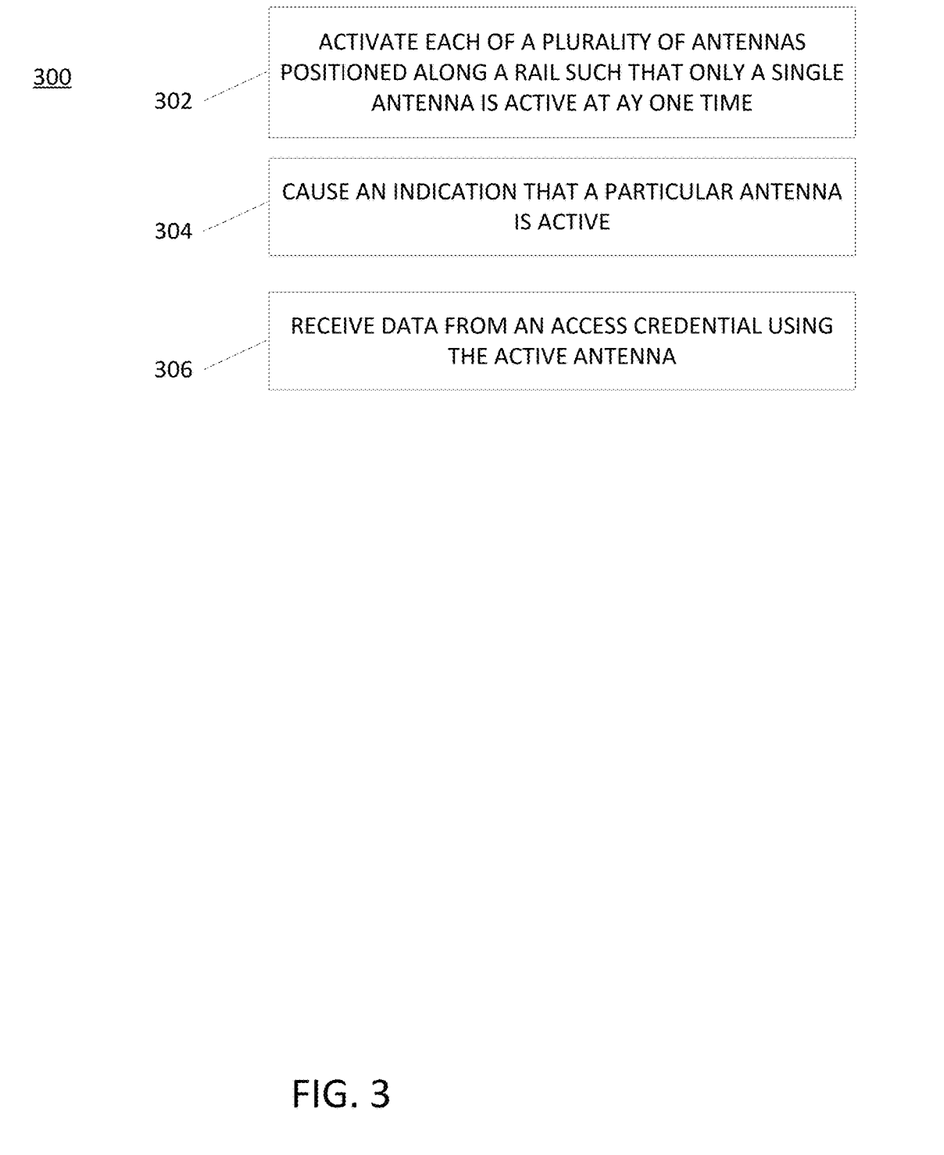
FIG. 3 depicts a flowchart of a process for operating a multi-point validation device according to embodiments.

FIG. 3 depicts a process 300 for operating a multi-point validation device. Process 300 may be performed using any of the multi-point validation devices described herein, such as validation device 100 and/or validation device 202. Process 300 may begin at block 300 by activating each of a plurality of radio frequency antennas positioned along a length of a generally horizontal elongate rail of a validation device in a sequence such that only a single one of the plurality of radio frequency antennas is active at a single time. The sequence of the activation/deactivation may be done in a number of manners. For example, in some embodiments the sequence is based on a time period that each of the plurality of radio frequency antennas is activated before activating to a subsequent one of the plurality of radio frequency antennas. Such a sequence is typically a repeating pattern that is easily discernable to users, allowing the users to easily predict which antennas will be activated next. In other embodiments, the sequence is based on which of the plurality of radio frequency antennas is in the proximity of the at least one access media. This may be determined in several ways. For example, an access credential may be detected in the signal range of a particular antenna by the antenna (or additional antenna assembly) detecting a modulation of the electromagnetic field by an access credential within the signal range of the antenna. In other embodiments, one or more proximity sensors may detect that a user and/or access credential is near and/or within a signal range of a particular antenna. In embodiments where the sequence is based on tracked users/credentials, the proximity sensors and/or antennas may continuously track the position of each user/credential over time and update the sequence based on the current positions of the various users. Each of the antennas, in turn, may be activated for a particular period of time (often less than 5 or 10 seconds) and then subsequently deactivated while a subsequent antenna is activated. The period of time may be extended if an access credential is being currently read/written to.

At block 304, the validation device may cause an indication that a single, particular one of the plurality of radio frequency antennas is active to be produced by at least one visual, audio, and/or haptic indicator associated with the active radio frequency antenna. For example, a light and/or graphical interface as described above may be positioned proximate the active radio frequency antenna and may illuminate and/or produce another visual indication of the active status of the antenna. In some embodiments, similar indications may be produced to indicate the status of some or all of the other inactive antennas. For example, the next antenna to be activated may be indicated as next with a message and/or a colored light, such as a yellow light, while antennas that are not being activated next may be indicated as such with a message and/or a red light, although it will be appreciated that any number of indication types/combinations may be utilized in a particular application.

At block 306, data is received by at least one reader module from at least one access media via the active radio frequency antenna. This data may include authentication information, payment information, account information, and/or other information that may be used by the validation device to validate the user of the access credential. The data may be validated locally by the validation device and/or by an external validation system. For example, the validation device may receive the data from the access credential and relay the data to the external validation system. The external validation system may validate the data and send a validation result to the validation device. Upon completing validation (either locally or remotely) the validation device may provide an indication of the validation result. For example, one or more visual, audio, and/or haptic indications may be produced by the validation device using lights, graphical interfaces, speakers, vibration mechanisms, and/or other indication systems. In some embodiments, the validation system may also send a command that causes the access media to produce one or more of an audio, visual, or haptic indication of a result of the validation of the received data. For example, when the access credential is a mobile phone, the command may cause a phone speaker to emit a sound, a phone light and/or display to produce a visual indication, and/or a vibration mechanism of the mobile phone to vibrate with a particular pattern/intensity to signify a particular validation result. In some embodiments, additional notifications may be sent to security personnel and/or a back office. In particular, embodiments may results in the validation device sending notifications to security and/or a back office if a validation is unsuccessful and the unauthorized user passes the validation device (or a barrier thereof). The notification may include identification information associated with the user, a time and location of the event, a photo of the user, and/or other data that may be useful to the entity operating the access controlled area.

In some embodiments, the volition device may include one or more physical barriers. In such embodiments, the validation result of the nearest user may be used to control a physical state of the barrier(s). For example, a successful validation may result in the barrier(s) being transitioned (or remaining) in an unlocked and/or unobstructing state, while an unsuccessful validation result may result in the barrier(s) being transitioned (or remaining) in a locked and/or obstructing state.

Figure 4:
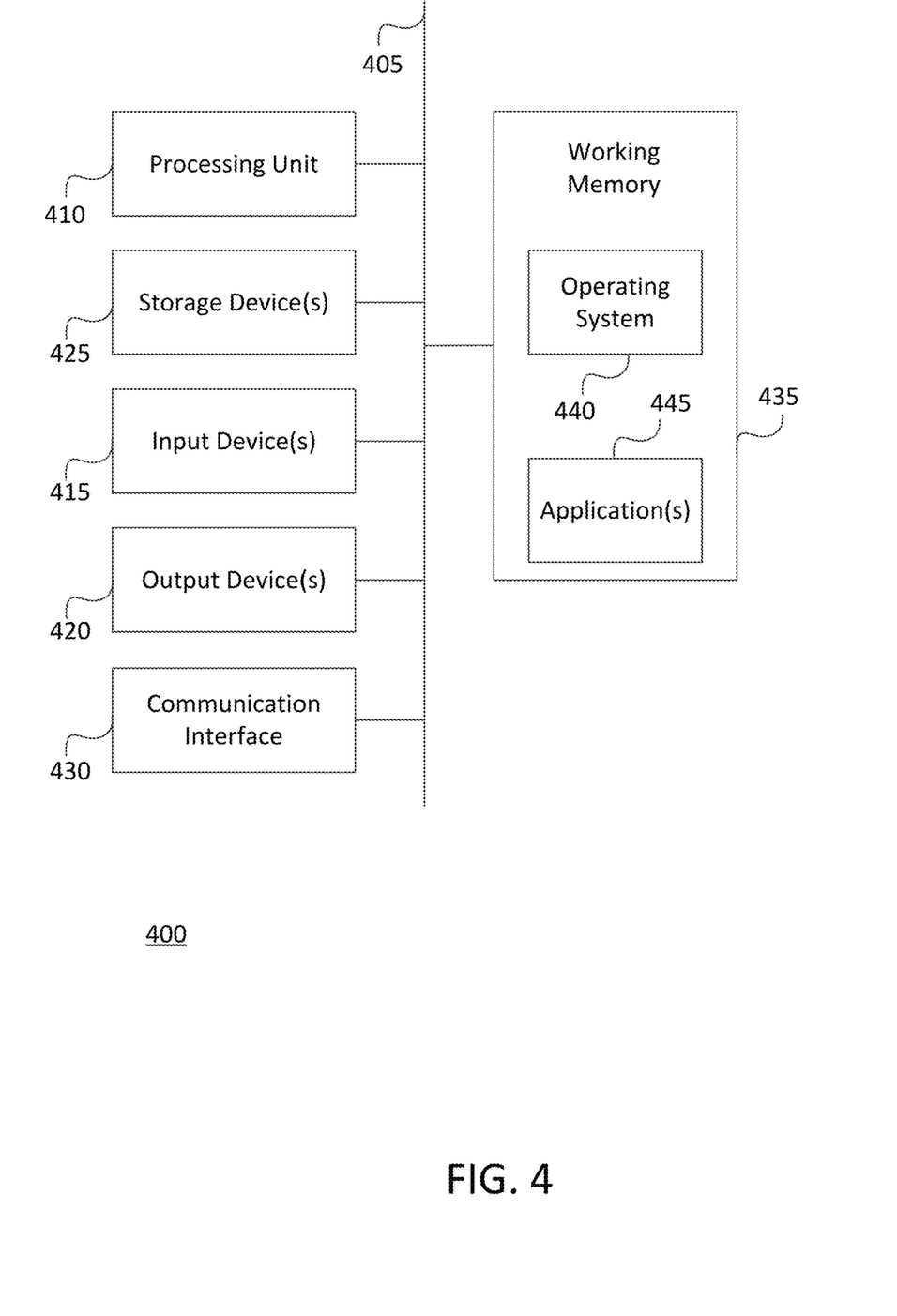
FIG. 4 is a schematic of a computer system according to embodiments.

A computer system as illustrated in FIG. 4 may be incorporated as part of the previously described computerized devices. For example, computer system 400 can represent some of the components of the neural computing system 102, and the like described herein. FIG. 4 provides a schematic illustration of one embodiment of a computer system 400 that can perform the methods provided by various other embodiments, as described herein. FIG. 4 is meant only to provide a generalized illustration of various components, any or all of which may be utilized as appropriate. FIG. 4, therefore, broadly illustrates how individual system elements may be implemented in a relatively separated or relatively more integrated manner.

The computer system 400 is shown comprising hardware elements that can be electrically coupled via a bus 405 (or may otherwise be in communication, as appropriate). The hardware elements may include a processing unit 410, including without limitation one or more processors, such as one or more special-purpose processors (such as digital signal processing chips, graphics acceleration processors, and/or the like); one or more input devices 415, which can include without limitation a keyboard, a touchscreen, receiver, a motion sensor, a camera, a smartcard reader, a contactless media reader, and/or the like; and one or more output devices 420, which can include without limitation a display device, a speaker, a printer, a writing module, and/or the like.

The computer system 400 may further include (and/or be in communication with) one or more non-transitory storage devices 425, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 400 might also include a communication interface 430, which can include without limitation a modem, a network card (wireless or wired), an infrared communication device, a wireless communication device and/or chipset (such as a Bluetooth™ device, an 502.11 device, a Wi-Fi device, a WiMAX device, an NFC device, cellular communication facilities, etc.), and/or similar communication interfaces. The communication interface 430 may permit data to be exchanged with a network (such as the network described below, to name one example), other computer systems, and/or any other devices described herein. In many embodiments, the computer system 400 will further comprise a non-transitory working memory 435, which can include a RAM or ROM device, as described above.

The computer system 400 also can comprise software elements, shown as being currently located within the working memory 435, including an operating system 440, device drivers, executable libraries, and/or other code, such as one or more application programs 445, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such special/specific purpose code and/or instructions can be used to configure and/or adapt a computing device to a special purpose computer that is configured to perform one or more operations in accordance with the described methods.

A set of these instructions and/or code might be stored on a computer-readable storage medium, such as the storage device(s) 425 described above. In some cases, the storage medium might be incorporated within a computer system, such as computer system 400. In other embodiments, the storage medium might be separate from a computer system (e.g., a removable medium, such as a compact disc), and/or provided in an installation package, such that the storage medium can be used to program, configure and/or adapt a special purpose computer with the instructions/code stored thereon. These instructions might take the form of executable code, which is executable by the computer system 400 and/or might take the form of source and/or installable code, which, upon compilation and/or installation on the computer system 400 (e.g., using any of a variety of available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, a risk management engine configured to provide some or all of the features described herein relating to the risk profiling and/or distribution can comprise hardware and/or software that is specialized (e.g., an application-specific integrated circuit (ASIC), a software method, etc.) or generic (e.g., processing unit 410, applications 445, etc.) Further, connection to other computing devices such as network input/output devices may be employed.

Some embodiments may employ a computer system (such as the computer system 400) to perform methods in accordance with the disclosure. For example, some or all of the procedures of the described methods may be performed by the computer system 400 in response to processing unit 410 executing one or more sequences of one or more instructions (which might be incorporated into the operating system 440 and/or other code, such as an application program 445) contained in the working memory 435. Such instructions may be read into the working memory 435 from another computer-readable medium, such as one or more of the storage device(s) 425. Merely by way of example, execution of the sequences of instructions contained in the working memory 435 might cause the processing unit 410 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 400, various computer-readable media might be involved in providing instructions/code to processing unit 410 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 425. Volatile media include, without limitation, dynamic memory, such as the working memory 435. Transmission media include, without limitation, coaxial cables, copper wire, and fiber optics, including the wires that comprise the bus 405, as well as the various components of the communication interface 430 (and/or the media by which the communication interface 430 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a magnetic medium, optical medium, or any other physical medium with patterns of holes, a RAM, a PROM, EPROM, a FLASH-EPROM, any other memory chip or cartridge, a carrier wave as described hereinafter, or any other medium from which a computer can read instructions and/or code.

The communication interface 430 (and/or components thereof) generally will receive the signals, and the bus 405 then might carry the signals (and/or the data, instructions, etc. carried by the signals) to the working memory 435, from which the processor(s) 405 retrieves and executes the instructions. The instructions received by the working memory 435 may optionally be stored on a non-transitory storage device 425 either before or after execution by the processing unit 410.

The methods, systems, and devices discussed above are examples. Some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It should be noted that the systems and devices discussed above are intended merely to be examples. It must be stressed that various embodiments may omit, substitute, or add various procedures or components as appropriate. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known structures and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

The methods, systems, devices, graphs, and tables discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. Additionally, the techniques discussed herein may provide differing results with different types of context awareness classifiers.

While illustrative and presently preferred embodiments of the disclosed systems, methods, and machine-readable media have been described in detail herein, it is to be understood that the inventive concepts may be otherwise variously embodied and employed, and that the appended claims are intended to be construed to include such variations, except as limited by the prior art.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein. As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A multi-point validation device, comprising:
    an elongate rail extending in a generally horizontal direction;
    a plurality of radio frequency antennas spaced apart along the length of the elongate rail;
    at least one reader module coupled with the plurality of radio frequency antennas;
    at least one visual indicator associated with each of the plurality of radio frequency antennas and positioned proximate a corresponding one of the plurality of antennas;
    at least one processor; and
    a memory configured to store instructions that, when executed cause the at least one processor to:
        activate a single one of the plurality of radio frequency antennas;
        cause an indication that the single one of the plurality of radio frequency antennas is active to be produced by the at least one visual indicator associated with the single one of the plurality of radio frequency antennas; and
        receive data, at the at least one reader module, from at least one access media via the single one of the plurality of radio frequency antennas.

2. The multi-point validation device of claim 1, wherein the instructions further cause the at least one processor to:
    deactivate the single one of the plurality of radio frequency antennas; and
    activate a second one of the plurality of radio frequency antennas.

3. The multi-point validation device of claim 2, wherein:
    the activation of the second one of the plurality of radio frequency antennas is triggered by detecting the presence of an additional access media within a signal range of the second one of the plurality of radio frequency antennas.

4. The multi-point validation device of claim 2, wherein:
    the deactivation of the single one of the plurality of radio frequency antennas and the activation of the second one of the plurality of radio frequency antennas are based on the single one of the plurality of radio frequency antennas being activated for a predetermined period of time.

5. The multi-point validation device of claim 1, wherein the instructions further cause the at least one processor to:

validate the received data to determine whether a user associated with the at least one access media is authorized to access a controlled area.

6. The multi-point validation device of claim 1, further comprising:
one or more of a radar sensor, a LIDAR sensor, infrared sensor, or an ultrasound sensor configured to detect a presence of an addition access media within a signal range of at least one of the plurality of radio frequency antennas.

7. The multi-point validation device of claim 1, further comprising:
a physical barrier that is configured to prevent access to a controlled area when in a blocked state, wherein the instructions further cause the at least one processor to manipulate the physical barrier into an access state in which a user associated with a successfully validated access media is allowed access to the controlled area.

8. A method of operating a multi-point validation device, comprising:
activating a single one of a plurality of radio frequency antennas, wherein the plurality of radio frequency antennas are positioned along a length of a generally horizontal elongate rail;
causing an indication that the single one of the plurality of radio frequency antennas is active to be produced by at least one visual indicator associated with the single one of the plurality of radio frequency antennas, the at least one visual indicator being positioned proximate the single one of the plurality of radio frequency antennas; and
receiving data by at least one reader module from at least one access media via the single one of the plurality of radio frequency antennas.

9. The method of operating the multi-point validation device of claim 8, further comprising:
deactivating the single one of the plurality of radio frequency antennas; and
activating a second one of the plurality of radio frequency antennas.

10. The method of operating the multi-point validation device of claim 8, wherein:
activating the second one of the plurality of radio frequency antennas is triggered by detecting the presence of an additional access media within a signal range of the second one of the plurality of radio frequency antennas.

11. The method of operating the multi-point validation device of claim 8, wherein:
deactivating the single one of the plurality of radio frequency antennas and activating the second one of the plurality of radio frequency antennas are based on the single one of the plurality of radio frequency antennas being activated for a predetermined period of time.

12. The method of operating the multi-point validation device of claim 8, further comprising:
validating the received data to determine whether a user associated with the at least one access media is authorized to access a controlled area.

13. The method of operating the multi-point validation device of claim 12, further comprising:
providing, using the at least one visual indicator, an indication of a result of the validation of the received data.

14. The method of operating the multi-point validation device of claim 12, further comprising:
sending a command that causes the at least one access media to produce one or more of an audio, visual, or haptic indication of a result of the validation of the received data.

15. A method of operating a multi-point validation device, comprising:
activating each of a plurality of radio frequency antennas positioned on an elongate rail in a sequence such that only a single one of the plurality of radio frequency antennas is active at a single time;
providing a visual indication that the single one of the plurality of radio frequency antennas is in an active state; and
receiving data by at least one reader module from at least one access media via the single one of the plurality of radio frequency antennas.

16. The method of operating the multi-point validation device of claim 15, wherein:
the sequence is based on a time period that each of the plurality of radio frequency antennas is activated before activating to a subsequent one of the plurality of radio frequency antennas.

17. The method of operating the multi-point validation device of claim 15, wherein:
the sequence is based on which of the plurality of radio frequency antennas is in the proximity of the at least one access media.

18. The method of operating the multi-point validation device of claim 15, further comprising:
detecting a presence of the at least one access media within a signal range of one of the plurality of radio frequency antennas.

19. The method of operating the multi-point validation device of claim 15, further comprising:
generating a validation result based on the received data.

20. The method of operating the multi-point validation device of claim 19, further comprising:
sending a command that causes haptic feedback that is indicative of the validation result to be produced by the at least access media.

* * * * *